United States Patent [19]
Brooks

[11] 3,824,888
[45] July 23, 1974

[54] SELF-TAPPING REPLACEMENT STUD WITH CHIP COLLECTION AND STORAGE CHAMBER

[76] Inventor: Daryl G. Brooks, 5240 N. Van Ness, Fresno, Calif. 93705

[22] Filed: July 17, 1972

[21] Appl. No.: 272,376

Related U.S. Application Data
[63] Continuation-in-part of Ser. No. 156,319, June 24, 1971, abandoned.

[52] U.S. Cl.................... 85/47, 10/140 H, 85/9 R, 85/32 R
[51] Int. Cl............................................ F16b 25/00
[58] Field of Search......................................... 85/47

[56] References Cited
UNITED STATES PATENTS

| | | | |
|---|---|---|---|
| 2,278,377 | 3/1942 | Cook | 85/47 |
| 2,800,820 | 7/1957 | Retterath | 81/53.2 |
| 3,260,150 | 7/1966 | Colman | 85/47 |
| 3,430,531 | 3/1969 | Bosse | 85/47 |

FOREIGN PATENTS OR APPLICATIONS

| | | | |
|---|---|---|---|
| 227,041 | 3/1958 | Australia | 85/47 |
| 150,473 | 9/1920 | Great Britain | 81/53.2 |
| 896,595 | 5/1903 | Great Britain | 85/47 |

*Primary Examiner*—Edward C. Allen
*Attorney, Agent, or Firm*—Huebner & Worrel

[57] ABSTRACT

A self-tapping replacement stud, for use in assembled engine blocks and similar workpieces in which the original threads of a stud bore have been inadvertently stripped, including an elongated shank having opposite ends and providing screw threads circumscribing one end, a collecting bore extended through the threads transversely of the shank bounded by a cutting edge adapted to form female threads in the stud bore when rotated therein, a stud driver adapted to be releasably attached to the end of the shank opposite to the threaded end engageable with the workpiece for controlling the depth of penetration of the threaded end into the stud bore, the collecting bore constituting a chamber for receiving and retaining the cuttings from the forming of new threads within the stud bore to avoid their being dropped into the workpiece, such as the crankcase of an engine.

6 Claims, 8 Drawing Figures

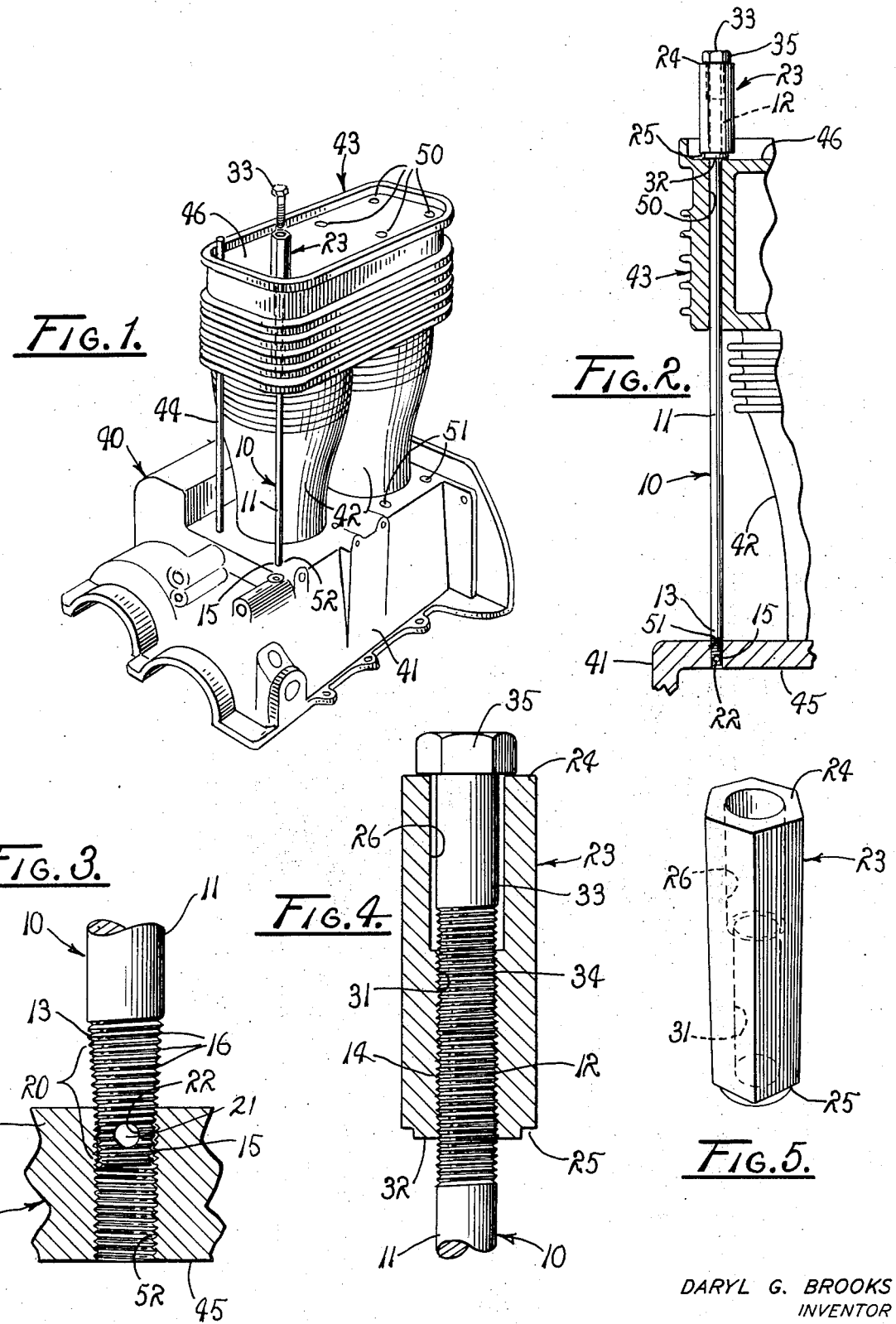

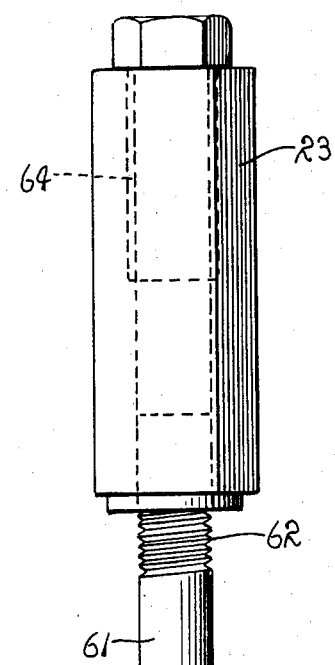
Fig. 6.
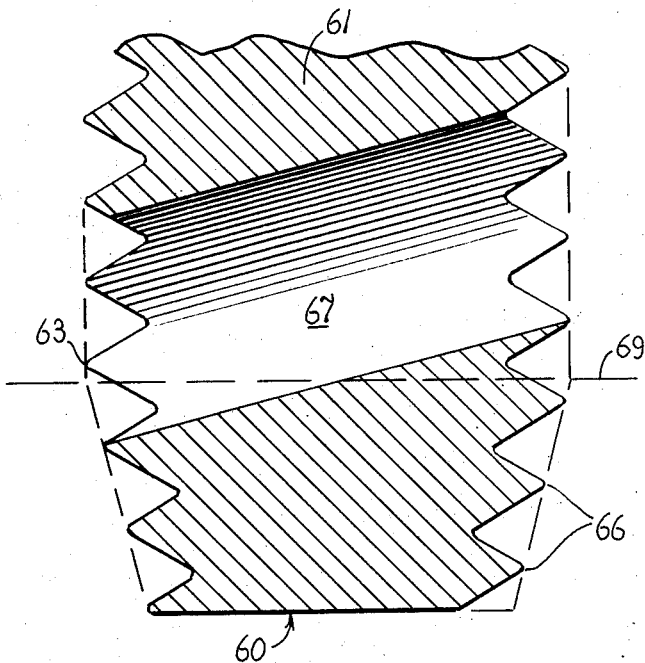
Fig. 7.
Fig. 8.
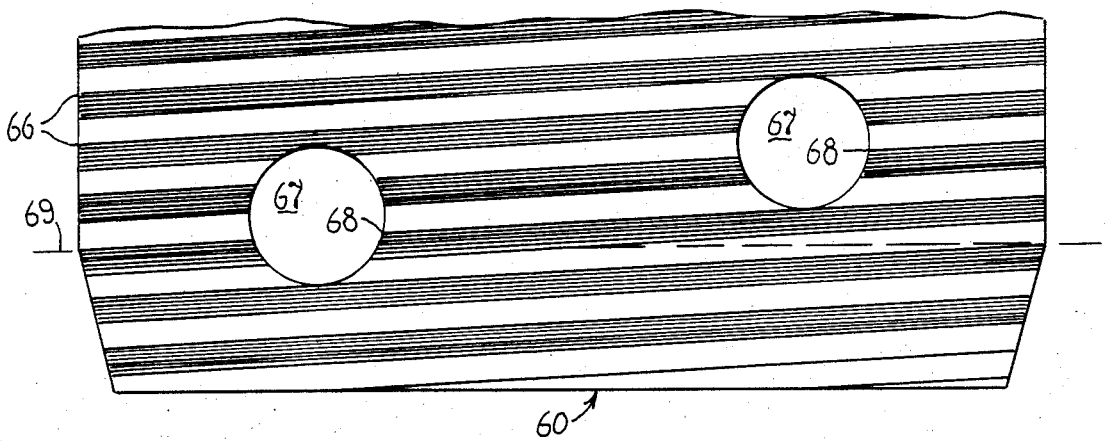

SELF-TAPPING REPLACEMENT STUD WITH CHIP COLLECTION AND STORAGE CHAMBER

CROSS REFERENCE TO RELATED APPLICATION

This application is a continuation-in-part of my copending application Ser. No. 156,319, filed June 24, 1971 and now abandoned, entitled Self-Tapping Replacement Stud With Chip Collection And Storage Chamber.

BACKGROUND OF THE INVENTION

The present invention relates to a self-tapping replacement stud for stripped stud bores and more particularly to such a replacement stud which has self-tapping threads and which automatically receives and confines cuttings produced by the tapping action to preclude their dispersal into any associated mechanism.

It is a well known problem in the reassembly of overhauled engines of various types having a plurality of threaded stud receiving bores that such bores can be inadvertently stripped of their threads during the torquing operation. Normally the stripped bore is drilled out and an over-size female threaded plug is installed to renew the threads, or the existing bore is tapped out to a larger size to receive an over-size bolt or stud. Both are tedious, time consuming and thus expensive operations.

A particular problem exists in some types of engines in which the bores communicate with the interior of the engine block or crankcase. This is true of certain types of automobile engines where elongated studs hold the cylinder blocks and heads in assembly with the crankcase. In reassembly after a major overhaul of such an engine, stud nuts must be tightened using a torque wrench to hold the head, block and crankcase in compressive assembled relation. During this torquing operation, the studs are often accidentally excessively rotated and the threads stripped from within their threaded stud bores in the crankcase. When the stud bores are drilled out or retapped in the conventional manner, the cuttings from the operation drop inwardly into the interior of the crankcase. As a result, the engine must be disassembled and thoroughly cleaned to remove such cuttings which is time-consuming, tedious and expensive. The replacement stud of the present invention eliminates any necessity for such additional cleaning and reassembly procedures. Further, it can be dependably anchored in a stripped bore virtually as quickly and easily as the original stud can be mounted in an undamaged bore and without subjecting any associated mechanism to chips, cuttings or other debris normally incident to tapping operations.

SUMMARY OF THE INVENTION

Therefore, it is an object of the present invention to provide an improved replacement stud having self-tapping threads for use in rebuilding engines.

Another object is to provide such a replacement stud which has a collection chamber automatically to collect and retain the cuttings produced by the self-tapping threads as the replacement stud is installed within a stud bore.

Another object is to provide such a replacement stud in which the cuttings are automatically sealed within the collection chamber.

Another object is to provide such a replacement stud which precludes the dropping of cuttings into the interior of an engine block during the screwing home of the replacement stud within the stud bore.

Another object is to provide such a replacement stud which obviates the necessity of disassembling an engine in order to clean the cuttings from the interior of the engine after retapping threads within a stripped stud bore.

Another object is to provide such a replacement stud which has a releasable stud driver at one end thereof which is adjustable selectively to define the maximum depth of penetration of the replacement stud within a stud bore and is thereafter removable to permit the attachment and tightening down of a stud nut on the replacement stud.

Another object is to provide such a replacement stud which eliminates the necessity for employing several tools in order to install a replacement stud.

Another object is to provide such a replacement stud which minimizes the expenditure of time involved in reassembling an overhauled engine.

Another object is to provide such a replacement stud which may take a variety of shapes and sizes for use in many different types of engines.

Another object is to provide such a replacement stud which is easy to operate.

Further objects and advantages are to provide improved elements and arrangements thereof in a device for the purposes described which is dependable, economical, durable, and fully effective in accomplishing its intended purposes.

BRIEF DESCRIPTION OF THE DRAWINGS

FIG. 1 is a perspective view of a crankshaft housing, cylinders and head of one type of engine in a partially assembled condition showing the installation of the self-tapping replacement stud of the present invention.

FIG. 2 is a fragmentary, transverse, vertical section of the partially assembled engine of FIG. 1 showing the replacement stud of the present invention screwed home to its maximum depth of permitted penetration within the stud bore as defined by the stud driver attached to the replacement stud.

FIG. 3 is a somewhat enlarged fragmentary view of the tapered end of the replacement stud partially threaded into a stripped stud bore in the housing shown fragmentarily in vertical section and showing the relationship of the collection chamber to the cutting zone of the self-tapping threads.

FIG. 4 is a somewhat enlarged fragmentary view of the upper portion of the replacement stud of the present invention showing the stud driver in vertical section thereon.

FIG. 5 is a perspective view of the stud driver of the present invention.

FIG. 6 is a side elevation of a second form of replacement stud of the present invention foreshortened for illustrative convenience.

FIG. 7 is an enlarged fragmentary section taken on line 7—7 in FIG. 6.

FIG. 8 is a fragmentary development view of the periphery of the tapping end portion of the second form of stud of the present invention.

DESCRIPTION OF THE PREFERRED EMBODIMENT

Referring in greater detail to the drawings, the self-tapping replacement stud of the present invention is indicated generally at 10. The replacement stud is constructed preferably of high strength steel. The replacement stud provides an elongated shank 11 having an upper portion or end 12 and a lower portion or end 13.

The shank 11 is of a maximum diameter which is a predetermined size larger than that of a stud bore in which it is designed to be used. Similarly, the length of the shank is governed by the design of the engine or other workpiece in which it is intended to be mounted. For illustrative purposes, the proportions of the replacement stud here shown are for use in a well-known make of automobile engine, but it is recognized that the shape and size of the embodiments of the replacement stud can be varied a great degree within the scope of the invention to accommodate a like variety of engines and other work objects.

A set of male screw threads 14 is formed about the upper portion 12 of the shank 11 and extends down the shank a sufficient dstance for dependable engagement therewith. The lower portion 13 of the shank provides a tapered end 15 which downwardly constricts from the diameter of the shank to a diameter somewhat smaller than that of the stud bore in which it is designed to be used. A set of self-tapping threads 16 is integrally formed about the tapered end and extends up the shank until reaching its full diameter. A cutting zone 20 is defined by the self-tapping threads and extends from approximately the point where the shank begins to taper to the point where the diameter of the tapered end becomes smaller than that of the stud bore in which it is designed to be used.

A chip collection chamber 21 is provided in the tapered end of the shank within the cutting zone and consists essentially of a bore running diametrically through the shank, as best shown in FIG. 3. At opposite ends, the bore is bounded by cutting edges 22 which actually perform the intended tapping operations.

An hexagonal stud driver 23 having an upper end 24 and a lower end 25 is threadably received on the upper portion 12 of the shank 11. The stud driver has a passage 26 running axially therethrough. Half of the passage adjacent to the lower end of the stud driver has internal screw threads 31 into which the screw threads 14 of the shank are threadably received. The remaining half of the passage adjacent to the upper end of the stud driver is of a slightly larger diameter than that of the threaded half of the passage and has a smooth surface. The lower end of the stud driver provides an axially disposed annular bearing surface 32. A lock bolt 33 is received in the passage at the upper end of the stud driver. The lock bolt has a threaded end 34 and a wrench head 35. The threaded end is threadably received in the internal screw threads 31 of the passage, as best shown in FIG. 4.

The replacement stud 10 of the present invention is shown for illustrative purposes for use in a particular type of automobile engine generally indicated at 40. As shown in FIGS. 1 and 2, such an automobile engine is in the process of reassembly and as thus far reassembled, the engine includes a crankshaft housing or crankcase 41, cylinder block 42, and a head 43. An original stud is shown at 44. The crankshaft housing has an interior 45 and the head has an upper surface 46. Several unthreaded stud bores 50 extend vertically through the head 43. Several corresponding, aligned, internally threaded stud bores 51 are provided in the crankshaft housing. When the crankshaft housing, block and head are assembled, as shown in FIGS. 1 and 2, the stud bores 50 and 51 are paired in corresponding vertical alignment. A stripped stud bore is represented at 52 in FIGS. 1 and 3.

SECOND FORM

A second form of self-tapping replacement stud of the present invention is shown at 60 in FIGS. 6, 7 and 8. It is substantially identical to the first form 10 in its provision of an elongated solid rod or shank 61 having a distal portion or end 62 and a cutting portion or end 63. The distal portion provides male screw threads 64 adapted to receive a stud driver 23 in the manner described in connection with the first form. The cutting portion is endwardly tapered and circumscribed by tapping threads 66. In a commercial version of the subject invention, the end tapers from 0.320 inches in diameter at the extreme end to full diameter, 27/64 inches at the third full thread, or in 0.200 inches. A bore 67 is extended transversely through the threads 66 of the cutting portion and constitutes a collection chamber. At opposite sides of the shank, the bore is bounded by cutting edges 68. While the bore 22 of the first form is extended diametrically through the shank 11 in right angular relation to the axis thereof, the bore 67 is extended substantially diametrically through the shank 61 in a plane common to the axis of the shank but it is obliquely related to the axis in said plane. In the exemplary commercial version, the bore is 3/16 inches in diameter and is formed at a 75° angle with respect to the axis of the stud. This is 15° relative to the radius. The bore is positioned so that the lower edge of its lower opening is adjacent to the upper end of the taper, shown by the dashed line 69, and so that its upper opening is above the upper end of the taper, as best shown in FIGS. 7 and 8. Thus, the cutting edges 68 are slightly displaced from each other axially of the shank 61 and are therefore disposed in threads 66 of slightly different diameters due to the tapered formation of the end of the stud. This has been found to be highly desirable for several reasons. The cutting edges exercise a dual cutting action. That is, threads started by the cutting edge of the end of the bore nearer the end of the stud are traced by the cutting edge of the end of the bore farther from the end of the stud. The cutting edges axially spaced in the stud accommodate stripped stud bores 52 which vary somewhat in diameter. By angling the bore it has a somewhat greater storing capacity. In all instances, however, both ends of the bore 67 are overlaid by the crankcase 41 whenever the cutting end is inserted into a stripped bore 52 to a depth sufficient for either of the cutting edges to commence their tapping action. Thus all chips resulting from the tapping action are captured and permanently confined in the bore.

OPERATION

The operation of the described embodiments of the subject invention is believed to be clearly apparent and is briefly summarized at this point. When a stud bore 52 becomes stripped and it is desired to reassemble the engine 40, the self-tapping replacement stud 10 or 60 of the present invention can be employed to avoid the previously required laborious task of removing the crankcase 41, boring out the stripped stud bores 52, tapping new threads in the enlarged stud bores, cleaning the cuttings from the interior 45 of the crankshaft housing, and finally reassembling the engine.

When the stud bore 52 is stripped, the original stud 44 in the stripped stud bore is first removed. In order to prepare the self-tapping replacement stud 10 or 60 for use in the stripped stud bore 52, the stud driver 23 is locked in a pre-selected position on the upper portion 12 or 62 of the shank 11 or 61. The length of the screw threads 14 and 64 along the upper portions of the shanks is sufficiently great that the stud driver 23 can be positioned throughout a relatively long range of distances from the tapered ends 15 and 63 of the shanks. Proper positioning of the stud driver is accomplished by first measuring the vertical distance from the interior side 45 of the crankcase 41 to the upper surface 46 of the cylinder cover 43 when the housings and cover are assembled as shown in FIG. 2. The stud driver is then threadably positioned on the shank so that the bearing surface 32 is this same distance from the terminus of the tapered end of the shank. The lock bolt 33 is then threaded into the screw threads 31 in the passage 26 of the stud driver until the remote portion of the threaded end 34 of the lock bolt is in facing engagement with the upper portion 12 or 62 of the shank, as shown in FIG. 4. The bolt thus serves as a jamb bolt and the stud driver is thus locked in position on the shank on which it is mounted.

The replacement studs 10 and 60 are installed by first passing their shanks 11 and 61 through the stud bore 50 and downwardly until the tapered ends 15 and 63 of the shanks are in nesting engagement with the stripped stud bores 52. Since the shanks are of a somewhat larger diameter than the stripped stud bores, the tapered ends extend into the stripped stud bores only the lengths of the portions thereof having a diameter smaller than that of the bore. The point of contact of the tapered end is within the cutting zone 20 of the first form and within the range of the opposite ends of the bore in the second form. The cutting edges 22 and 68 are located in the cutting zones and come into engagement with the walls of the stud bore as the collecting bores 21 and 67 enter the stud bores and thus are overlaid and closed by the crankcase 41. Using any conventional wrench engaged with the head 35 of the stud driver 23, the shank is rotated in a normal clockwise direction while pressure is exerted downwardly on the replacement stud while making certain that a vertical attitude is maintained. The self-tapping threads 16 or 66 are thereby driven into the stripped stud bore 52 tapping out new threads and simultaneously screwing the replacement stud home in the renewed threads. Cuttings or chips are produced by the tapping out of the new threads by the cutting edges. As the cuttings or chips are formed they are received by the collection chambers or bores 21 and 67. Since both ends of the bores are overlaid and sealed by the walls of the stud bore, none of the cuttings or chips can escape from such bores into the crankcase 41. Since the replacement studs are permanently installed, once they are screwed home, or at least installed until their removal from the crankcase may become desirable during some subsequent engine disassembly, the cuttings and chips are in effect permanently encapsulated within the bores or at least captured therein until some eventual disassembly of the engine makes removal of the replacement studs desirable.

When the bearing surface 32 of the stud driver 23 contacts the upper surface 46 of the cylinder cover 43, the replacement stud has been installed at its intended depth of penetration within the stud bore 52. It will again be noted that, as shown in FIG. 2, the collection chamber or bore 21 is completely enclosed within the stud bore. The same is true of the collecting bore 67 of the second form when it is installed. The cuttings are thereby sealed within the collection chamber and are prevented from being jostled out to fall into the interior of the crankcase 41. So installed, the replacement studs are dependably and securely anchored in place.

The jamb bolt 33 is then unscrewed from the stud driver 23 and the stud driver unscrewed from the upper ends 24 or 62 of the installed replacement stud. A stud nut, not shown, can then be threadably received on the screw threads 14 or 64 of the upper portion of the shank and tightened to the desired extent so as securely to hold the crankcase 41, cylinder block 42, and head 43 in the assembled relation shown in FIGS. 1 and 2.

It will be seen that one stud driver 23 and lock bolt 33 are all that need be maintained on hand to be used with the replacement studs. It will also be seen that necessity for maintaining thread tapping tools on hand for this purpose is avoided. The replacement studs can be installed without getting cuttings or chips in the crankcase. Thus a stripped stud can be replaced without disassembling and cleaning the engine. The replacement studs of the present invention have saved so much time and labor in performing many engine repair services that the costs thereof have been reduced to a fraction of those previously required.

Although the invention has been herein shown and described in what are conceived to be the most practical and preferred embodiments, it is recognized that departures may be made therefrom within the scope of the invention, which is not to be limited to the illustrative details disclosed.

I claim:

1. A stud for anchored engagement in a bore of a workpiece comprising an elongated rod adapted for rotation about a longitudinal axis having a screw-threaded cutting end and a distal end, the cutting end being circumscribed by screw threads and being endwardly tapered from a position intermediate opposite ends of the screw threads whereby said screw threads have a portion of substantially uniform diameter and an endwardly tapered portion, and a collecting bore extended obliquely through the rod having opposite ends providing thread cutting edges adapted to cut female threads in the workpiece when the rod is rotated in the bore thereof and to discharge chips resulting from thread formation into the collecting bore, one of said ends of the bore being in the tapered portion of the threads but overlapping said position and the other end of the bore opening into the screw threads of uniform diameter so as to be tightly overlaid by the workpiece when the cutting edges are in the bore of the workpiece to capture such chips in the collecting bore as they are formed and when the rod is anchored in the bore permanently to retain the chips in the collecting bore.

2. The stud of claim 1 including means on the rod having a bearing surface disposed toward the workpiece and engageable therewith to limit depth of engagement of the cutting end in the workpiece whereby the screw threads of uniform diameter can be tightened in the bore of the workpiece with opposite ends of the collecting bore being overlaid thereby.

3. A self-tapping replacement stud having a screw-threaded tapping end for anchored engagement in a bore in a first workpiece, a shank for rotatable extension through a bore in a second associated workpiece and a screw-threaded opposite end, the tapping end being circumscribed by screw threads and being endwardly tapered from a position intermediate opposite ends of the screw threads whereby said screw threads have a portion of substantially uniform diameter slightly greater than that of the bore of the first workpiece and an endwardly tapered portion; a collecting bore extended obliquely therethrough having an end opening in the tapered portion of the threads but overlapping said position and an opposite end in the portion of the threads of uniform diameter, each of the ends of the bore being bounded by a cutting edge and opposite extremities of the cutting edges being in portions of said end of different diameters with the opposite ends of the bore tightly overlaid by the first workpiece to encapsulate cuttings from the cutting edges therein; a nut having a wrench head screw-threadably mounted on said opposite end of the rod for adjustable positioning therealong providing a bearing face disposed toward the second workpiece engageable with the second workpiece to limit the depth of engagement of the tapping end with the first workpiece; and a jamb bolt screw-threadably mounted in the nut releasably engageable with the rod to secure the nut in adjusted position thereon.

4. The combination of claim 3 in which the nut and jamb bolt are removable to receive a nut on said opposite end of the rod for tightened engagement with the second workpiece to hold the workpieces in compressive engagement.

5. A self-tapping replacement stud comprising a rod having an end adapted for insertion into a stud bore of a workpiece, said end being circumscribed by screw threads and being endwardly tapered from a position intermediate opposite ends of the screw threads whereby said screw threads have a portion of substantially uniform diameter slightly greater than that of the stud bore and an endwardly tapered portion, and a bore extended obliquely through the rod having an end opening in the tapered portion of the threads but overlapping said position and an opposite end in the portion of the threads of uniform diameter, each of the ends of the bore being bounded by a cutting edge and opposite extremities of the cutting edges being in portions of said end of different diameters with the opposite ends of the bore tightly overlaid by the workpiece to incapsulate cuttings from the cutting edges therein.

6. A self-tapping replacement stud comprising a rod having an end adapted for insertion into a stud bore of a workpiece, said end being circumscribed by screw threads and being endwardly tapered from a position intermediate opposite ends of the screw threads whereby said screw threads have a portion of substantially uniform diameter slightly greater than that of the stud bore and an endwardly tapered portion, and a collecting bore extended obliquely through the rod in spaced relation to the end of the rod in a plane disposed diametrically and axially of the rod and having an end bounded by a cutting edge in the tapered portion of the threads but overlapping said position and having an opposite end bounded by a cutting edge disposed in the threads of uniform diameter and each end of the opening being positioned so as to be closed by the workpiece to capture the chips in the collecting bore when said end of the rod is inserted into the stud opening sufficiently to bring the cutting edges into workpiece engagement.

* * * * *